(12) United States Patent
Weber et al.

(10) Patent No.: US 11,399,133 B2
(45) Date of Patent: Jul. 26, 2022

(54) IMAGE CAPTURE DEVICE WITH AN AUTOMATIC IMAGE CAPTURE CAPABILITY

(71) Applicant: GoPro, Inc., San Mateo, CA (US)

(72) Inventors: Clark Weber, San Mateo, CA (US); Nicholas Ryan Gilmour, San Jose, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 17/327,628

(22) Filed: May 21, 2021

(65) Prior Publication Data

US 2021/0281747 A1    Sep. 9, 2021

Related U.S. Application Data

(63) Continuation of application No. 16/709,340, filed on Dec. 10, 2019, now Pat. No. 11,019,253.

(60) Provisional application No. 62/785,491, filed on Dec. 27, 2018.

(51) Int. Cl.
*H04N 5/232*    (2006.01)
*H04N 5/343*    (2011.01)
*G06T 1/00*    (2006.01)

(52) U.S. Cl.
CPC ......... *H04N 5/23222* (2013.01); *H04N 5/343* (2013.01); *G06T 1/0007* (2013.01)

(58) Field of Classification Search
CPC .. H04N 5/23222; H04N 5/343; H04N 5/2625; H04N 5/23232; H04N 5/23219; G06T 1/0007
See application file for complete search history.

(56) References Cited

U.S. PATENT DOCUMENTS

2014/0362256 A1* 12/2014 Schulze ............. H04N 5/23277
                                                 348/231.99
2016/0322078 A1* 11/2016 Bose ...................... H04N 5/247
2019/0026590 A1*  1/2019 Tanaka ............... G06K 9/00664

* cited by examiner

*Primary Examiner* — Yogesh K Aggarwal
(74) *Attorney, Agent, or Firm* — Esplin & Associates, PC

(57) ABSTRACT

An image capture device may automatically capture images. An image sensor may generate visual content based on light that becomes incident thereon. A motion of interest within the visual content may be identified, and multiple images may be generated to include portions of the visual content that span a time duration of interest.

20 Claims, 6 Drawing Sheets image 512 image 514 image 516 composite image 520 composite image 530

IMAGE CAPTURE DEVICE WITH AN AUTOMATIC IMAGE CAPTURE CAPABILITY

FIELD

This disclosure relates to an image capture device that automatically captures images based on motion.

BACKGROUND

Camera users may wish to capture images of interesting motion. However, manually using camera controls to capture images of interesting motion may be difficult or make it difficult for the users to experience the interesting motions.

SUMMARY

This disclosure relates to an image capture device that automatically captures images based on motion. An image capture device may include a housing. The housing may carry one or more of an image sensor, an optical element, a processor, an electronic storage, and/or other components. The optical element may guide light within a field of view to the image sensor. The image sensor may generate an output signal conveying visual information defining visual content based on light that becomes incident thereon. The processor(s) may be configured to operate the image capture device. Operation of the image capture device may include identification of one or more motions of interest within the visual content. A motion of interest may occur during a moment of interest. One or more time durations of interest may be determined based on the moment(s) of interest and/or other information. Multiple images may be generated from the visual content based on the motion(s) of interest and/or other information. The multiple images may include portions of the visual content that span the time duration(s) of interest.

An electronic storage may store visual information defining visual content, information relating to visual content, information relating to motions of interest, information relating to time durations of interests, information relating to images, and/or other information. Visual content may be included within one or more images and/or one or more videos. For example, visual content may be defined within one or more images and/or one or more video frames of a video. Visual content may be stored in one or more formats and/or one or more containers.

The housing may carry one or more components of the image capture device. The housing may carry (be attached to, support, hold, and/or otherwise carry) one or more of an image sensor, an optical element, a processor, an electronic storage, and/or other components.

The optical element may be configured to guide light within a field of view to the image sensor. In some implementations, the field of view may be greater than 180 degrees. In some implementations, the housing may carry one or more additional optical elements.

The image sensor may be configured to generate an output signal. The output signal may convey visual information based on light that becomes incident on the image sensor and/or other information. The visual information may define visual content. In some implementations, the housing may carry one or more additional image sensors.

The processor(s) may be configured by machine-readable instructions.

Executing the machine-readable instructions may cause the processor(s) to facilitate operation of the image capture device. The machine-readable instructions may include one or more computer program components. The computer program components may include one or more of a motion detection component, a time duration component, a generation component, and/or other computer program components.

The motion detection component may be configured to identify one or more motions of interest within the visual content. A motion of interest may occur during a moment of interest. In some implementations, a motion of interest may include a motion of the image capture device and/or a motion of one or more objects within the visual content.

The time duration component may be configured to determine one or more time durations of interest based on the moment(s) of interest and/or other information. In some implementations, a moment of interest may include a start time point and an end time point, and a corresponding time duration of interest may be determined to start at the start time point and end at the end time point. In some implementations, a moment of interest may include a time point, and a corresponding time duration of interest may be determined to include a duration of time preceding the time point and/or a duration of time subsequent to the time point.

In some implementations, a time duration of interest may be determined further based on classification of a motion of interest. The classification of the motion of interest may include classification of one or more activities and/or classification of one or more actions within the visual content during the moment of interest. The classification of the motion of interest may further include classification of one or more locations within the visual content during the moment of interest.

The generation component may be configured to generate multiple images from the visual content based on the motion(s) of interest and/or other information. The multiple images may include portions of the visual content that span the time duration(s) of interest.

In some implementations, the multiple images may be generated at one or more resolutions. The resolution(s) with which the multiple images are generated may be higher than a resolution with which the image capture device generates videos.

In some implementations, the multiple images may be generated based on an operation of the image capture device in a motion burst capture mode and/or other modes. The operation of the image capture device in the motion burst capture mode may include setting of one or more resolutions to generate the multiple images and may not include generation of a video.

In some implementations, generation component may be further configured to generate one or more composite images based on the multiple images and/or other information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As

DETAILED DESCRIPTION

Figure 1:
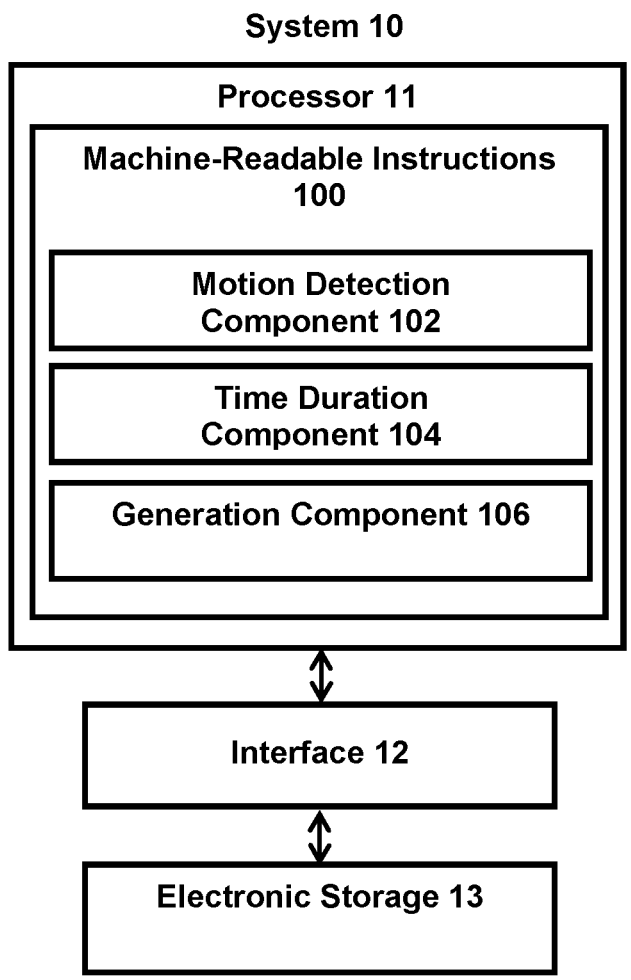
FIG. 1 illustrates a system that automatically captures images.

FIG. 1 illustrates a system 10 for automatically capturing images. The system 10 may include one or more of a processor 11, an interface 12 (e.g., bus, wireless interface), an electronic storage 13, and/or other components. An output signal conveying visual information defining visual content may be generated based on light that becomes incident on an image sensor. The processor 11 may identify one or more motions of interest within the visual content. A motion of interest may occur during a moment of interest. The processor 11 may determine one or more time durations of interest based on the moment(s) of interest and/or other information. The processor 11 may generate multiple image from the visual content based on the motion(s) of interest and/or other information. The multiple images may include portions of the visual content that span the time duration(s) of interest.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store visual information defining visual content, information relating to visual content, information relating to motions of interest, information relating to time durations of interests, information relating to images, and/or other information.

Visual content may refer to content that may be consumed visually. Visual content may be included within one or more images and/or one or more videos. For example, visual content may be included within one or more images and/or one or more video frames of a video. As used herein, term video frame may be used to refer to one or more of an image frame, frame of pixels, encoded frame (e.g., I-frame, P-frame, B-frame), and/or other types of video frame. Visual content may be stored in one or more formats and/or one or more containers. Visual content may be defined by visual information.

Figure 3:
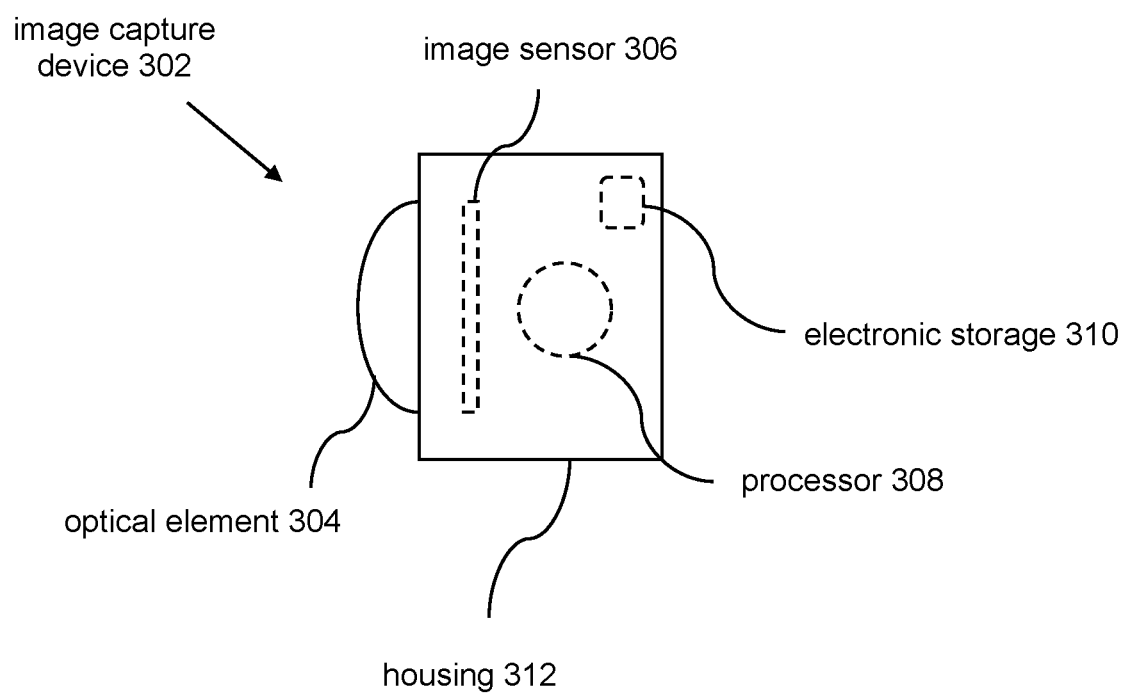
FIG. 3 illustrates an example image capture device.

FIG. 3 illustrates an example image capture device 302. Visual content may be captured by the image capture device 302 and/or other image capture devices. The image capture device 302 may include a housing 312, and the housing 312 may carry (be attached to, support, hold, and/or otherwise carry) one or more components of the image capture device 302, such as one or more of an optical element 304, an image sensor 306, a processor 308, an electronic storage 310, and/or other components. The image capture device 302 may include multiples of the components shown in FIG. 3 and/or other components. For example, the image capture device 302 may include multiple optical elements and multiple image sensors, with the multiple optical elements configured to enable the image capture device 302 to capture spherical visual content (e.g., content of spherical images/videos). Other configurations of image capture devices are contemplated.

The optical element 304 may include instrument(s), tool(s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may be configured to guide light within a field of view to the image sensor 306. In some implementations, the field of view of the optical element 304 may be greater than 180 degrees. In some implementations, the housing 312 may carry one or more additional optical elements.

The image sensor 306 may include sensor(s) that converts received light into one or more output (electrical) signals. The image sensor 306 may generate output signals conveying visual information that defines visual content. The visual content may be included within and/or be used to generate one or more images and/or one or more videos (e.g., one or more video frames of a video). In some implementations, the image sensor 306 may include one or more of a charge-coupled device sensor, an active pixel sensor, a complementary metal-oxide semiconductor sensor, an N-type metal-oxide-semiconductor sensor, and/or other image sensors.

The image sensor 306 may be configured to generate output signals conveying visual information (defining visual content) based on light that becomes incident thereon and/or other information. For example, the optical element 304 may be configured to guide light within a field of view to the image sensor 306, and the image sensor 306 may be configured to generate output signals conveying visual information based on light that becomes incident thereon via the optical element 304. In some implementations, the housing 312 may carry one or more additional image sensors.

The processor 308 may include one or more processors (logic circuitry) that provide information processing capabilities in the image capture device 302. The processor 308 may provide one or more computing functions for the image capture device 302. The processor 308 may operate and/or send command signals to one or more components of the image capture device 302 to facilitate operation of the image capture device 302. For example, the processor 308 may facilitate operation of the image capture device 302 in capturing image(s) and/or video(s), facilitate operation of the optical element 304 (e.g., change how light is guided by the optical element 304), and/or facilitate operation of the image sensor 306 (e.g., change how the received light is converted into information that defines images/videos and/or how the images/videos are post-processed after capture). The processor 308 may include and/or perform one or more functionalities of the processor 11 shown in FIG. 1.

The image capture device 302 may include other sensors, such as one or more motion sensors. A motion sensor may refer to one or more sensors that converts experienced motions into output signals. The output signals may include electrical signals. A motion sensor may generate output signals conveying information that characterizes motions and/or positions of the motion sensor and/or device(s) carrying the motion sensor, such as the image capture device 302. The motions/positions characterized by a motion sensor may include translational motions/positions and/or rotational motions/positions. For example, a motion sensor may refer to a set of motion sensors, which may include one or more inertial measurement units, one or more accelerometers, one or more gyroscopes, and/or other motion sensors.

The electronic storage 310 may refer to electronic storage medium that electronically stores information. The electronic storage 310 may store software algorithms, information determined by the processor 308, information generated by the image sensor 306, information received remotely, and/or other information that enables the image capture device 302 to function properly. The electronic storage 310 may be used as temporary and/or permanent storage of information generated by the image capture device 302. For example, visual information generated by the image sensor 306 may be stored as one or more images and/or one or more videos within the electronic storage 310 as one or more files for later retrieval and/or playback. Visual information generated by the image sensor 306 may be temporarily stored within the electronic storage 310 (e.g., one or more portions of the electronic storage 310 is used as a buffer) to perform and/or during identification of motion of interest within the visual content defined by the visual information. Based on an identification of a motion of interest within the visual content, multiple images including portions of the visual content that span a time duration of interest may be generated from the visual content. Based on the visual content not including a motion of interest, the visual content (corresponding visual information) may be discarded.

In some implementations, the image capture device 302 may be configured to operate in a motion burst capture mode and/or other modes. The operation of the image capture device 302 in the motion burst capture mode may not include generation of a video. For example, the operation of the image capture device 302 in the motion burst capture mode may include generation of output signals by the image sensor 306, with the output signals conveying visual information such as for the image capture device 302 to generate a video. But rather than generating a video, the visual content captured by the image sensor 306 may be analyzed by the processor 308 to determine whether and when the visual content includes a motion of interest and/or may be temporarily stored while the processor 308 to determine, based on information other than the visual content (e.g., information generated by a motion sensor), whether and when the visual content includes a motion of interest.

The processor 308 may use the visual content to generate one or more images based on the motion of interest, with the image(s) including those portions of the visual content that span a corresponding time duration of interest. Other portions of the visual content and/or the portions of the visual information not used by the processor 308 to generate the image(s) may be discarded (e.g., deleted; removed from memory, such as the electronic storage 310; left in memory buffer to be overwritten). Thus, the image capture device 302 may "record" those portions of the visual content that is of interest to user(s) without "recording" a video (e.g., storing information defining the video in the electronic storage 310 for later retrieval and/or playback).

The operation of the image capture device 302 in the motion burst capture mode may include setting of one or more resolutions to generate the image(s). The resolution(s) with which the image(s) are generated may be higher than a resolution with which the image capture device 302 generates videos. Since the operation of the image capture device 302 in the smart image capture does not include generation of video(s), the image capture device 302 may have more storage space (e.g., within the electronic storage 310) to store images. Thus, high-quality images may be stored, such as by using a higher resolution than the maximum resolution at which the image capture device 302 may generate videos.

The image capture device 302 may operate in the motion burst capture mode based on activation of the motion burst capture mode by a user, based on detection of a motion of interest, and/or other information. For example, one or more options to activate the motion burst capture mode may be provided via one or more physical buttons (e.g., buttons on the housing 312 of the image capture device 302) and/or one or more virtual buttons (e.g., buttons presented on a display of the image capture device 302). Activation of the option may result in the image capture device 302 identifying motions of interest within the visual content and generating images of the visual content including the motions of interest (e.g., portions of the visual content that span a time duration of interest). For example, during the operation of the image capture device 302 in the motion burst capture mode, inclusion of motion of interest within the visual content may be identified based analysis of the visual content (e.g., optical flow analysis), analysis of information generated by a motion sensor (e.g., information generated by one or more inertial measurement units, one or more accelerometers, one or more gyroscopes, and/or other motion sensors of the image capture device), and/or other information. Multiple images (bursts of pictures) of the motion of interest (e.g., images span a corresponding time duration of interest) may be generated from the visual content. As another example, multiple images may include the motion of interest that triggered the operation of the image capture device 302 in the motion burst capture mode.

For example, the visual content captured by the image capture device 302 may include visual representation of a person jumping into a swimming pool and the burst of images generated for this motion may include images of (1) the person starting to jump off the ground, (2) the person in the air, (3) the person hitting the water, and (4) the person going into the water. The burst of image may be provided to the user (e.g., for selection, for viewing, for storage, for upload).

Figure 4:
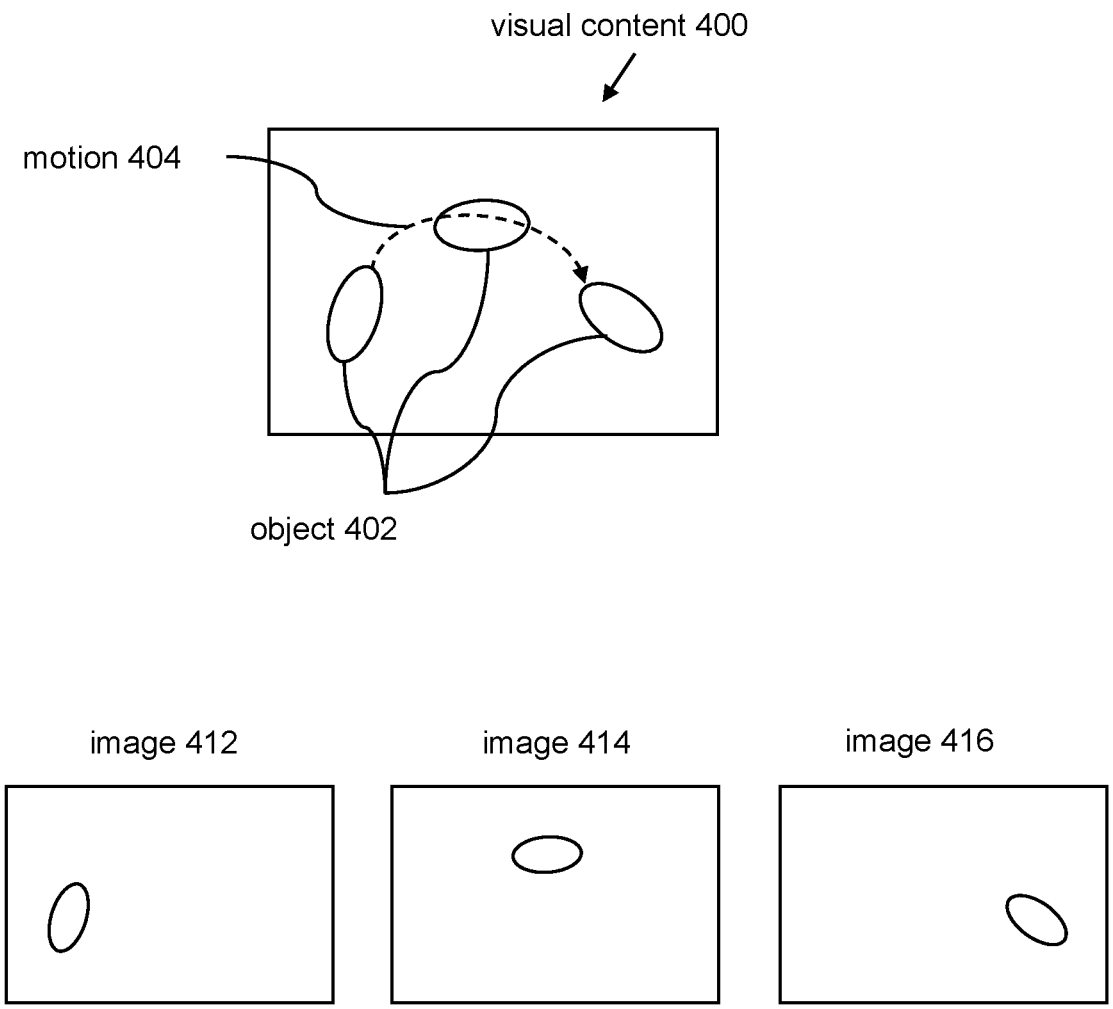
FIG. 4 illustrates an example motion of interest and example images generated based on the motion of interest.

For example, FIG. 4 illustrates an example motion of interest and example images generated based on the motion of interest. Visual content 400 captured by an image capture device may include depiction of an object 402 undergoing a motion 404. The object 402 undergoing the motion 404 may result in the representation of the object 404 being positioned within different locations within the visual content at different times. The motion 404 may be a motion of interest. Based on the identification of the motion 404 within the visual content 404, multiple images 412, 414, 416 may be generated. The images 412, 414, 416 may span a time duration of interest corresponding to the motion 404. The image 412 may be generated from the visual content 400 captured at the beginning of the time duration of interest. The image 414 may be generated from the visual content 400 captured in the middle of the time duration of interest. The image 412 may be generated from the visual content 400 captured at the end of the time duration of interest.

Other generations of images based on motion of interest are contemplated.

Referring back to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate operation of an image capture device, such as the image capture device 302 shown in FIG. 3. The machine-readable instructions 100 may include one or more computer program components. The machine-readable instructions 100 may include one or more of a motion detection component 102, a time duration component 104, a generation component 106, and/or other computer program components.

The motion detection component 102 may be configured to identify one or more motions of interest within the visual content. A motion of interest may refer to visual representation of motion within the visual content that one or more user may find interesting and/or may be interested in capturing in media form (e.g., image(s), video(s)). A motion of interest may include motion of a single object or motion of multiple objects. A motion of interest may include motion of an image capture device (e.g., the image capture device 302) and/or a motion of one or more objects within the visual content (e.g., captured by the image capture device 302, within the field of view of the image capture device 302). A motion of interest may include motion of a single action/activity or motion of multiple actions/activities (e.g., in a sequence).

A motion of interest may occur within visual content during a moment of interest. A moment of interest may include one or more points in time and/or one or more durations of time. For example, a motion of interest may be captured by the image capture device 302 at one point in time, within a single image, and/or within a single video frame. A motion of interest may be captured by the image capture device 302 over a duration of time, within multiple images, and/or within multiple video frames. A motion of interest may be included within the entire spatial view of the visual content (e.g., entire view captured within an image or multiple images) or one or more spatial portions of the visual content (e.g., one or more portions of a view captured within an image or multiple images). That is, the motion of interest may be included within the entirety of the visual content at the moment of interest or within one or more spatial portions of the visual content at the moment of interest.

The motion detection component 102 may identify a motion of interest based on analysis of the visual content (e.g., optical flow analysis), analysis of information generated by one or more motion sensors (e.g., information generated by one or more inertial measurement units, one or more accelerometers, one or more gyroscopes, and/or other motion sensors of the image capture device 302), and/or other information. Analysis of the visual content and/or information generated by motion sensor(s) sensors may be used to determine/identify the motion present within the visual content. One or more particular motion determined/identified to be present within the visual content may be identified as motion of interest. For example, the motion detection component 102 may access information identifying and/or defining motion of interest and determine whether the motion determined/identified to be present within the visual content matches the motion identified/defined by the information.

In some implementations, the motion detection component 102 may identify one or more motions of interest within visual content based on motion vector extraction and/or other information. Motion vectors may represent motion of one or more visuals/pixels captured within visual content (e.g., images, video frames). Motion may exist within visual content due to motion of image capture device that captured the visual content and/or due to motion of an object captured within the visual content (e.g., an object within the field of view of the image capture device). Motion vectors may be determined using one or more of block-matching algorithm, phase correlation and frequency domain methods, pixel recursive algorithms, optical flow, feature detection, and/or other criteria matching methods.

Motion vector may represent movement of one or more pixels and/or groupings of pixels within visual content (e.g., between images, between video frames). For example, motion vector may represent movement of an object captured within visual content from a location within the spatial extent of the visual content to another location within the spatial extent of the visual content. Motion vector may be characterized by direction(s) of motion (linear and/or angular) and magnitude(s) of motion.

Motion vector analysis may include analysis of motion within the entire spatial extent of visual content (e.g., an entire image/video frame) and/analysis of motion within particular portion(s) of the spatial extent of visual content. For example, the spatial extent of the visual content may be divided into multiple portions (e.g., macro blocks) and motion vector of individual portions may be determined. Motion vectors of the individual portions may be combined (e.g., summed, square summed, averaged) to determine the motion for the entire spatial extent of the visual content. Visual content corresponding to different moments (e.g., individual images/video frames) may be associated with global motion (e.g., motion of the visual content as a whole) and/or local motion (motion of a portion of the spatial extent of the visual content).

In some implementations, the motion detection component 102 may identify one or more motions of interest within visual content based on video compression and/or other information. Video compression may result in one or more video frames that include information for entire viewable dimensions of the video frames (e.g., I-frame) and one or more video frames that include information for portions of the viewable dimensions of the video frames (e.g., P-frame, B-frame). A video frame may include information regarding changes in the video frames from prior frames, subsequent frames, or both. Information regarding changes in the video frames may characterize and/or be defined by the motion within the visual content. Motion detection component 102 may use the information regarding changes in the video frame to identify one or more motions of interest within visual content A motion of interest may include capture motion, object motion, and/or other motion. Capture motion may refer to motion/operation of image capture device(s) that captured the visual content. Capture motion may include motion/operation of the image capture device (s) at a time, over a duration of time, at a location, or over a range of locations. As non-limiting examples, capture motion may include one or more of zoom, pan, tilt, dolly, truck, pedestal, and/or other capture of the visual content by the image capture device(s). In some implementations, capture motion may include a direction of gravity on the image capture device(s) during the capture of the visual content. The direction of gravity may indicate the positioning of the image capture device(s) with respect to gravity during capture of the visual content (e.g., upright, tilted, flipped). In some implementation, capture motion of the visual content may be determined based on movement sensors (e.g., accelerometer, gyroscope, IMU) that measure the motion of the image capture device(s).

Object motion may refer to motion of object within the visual content (object captured within the field of view of image capture device(s)). Object motion may include motion of one or more objects at a time, over a duration of time, at a location, or over a range of locations. As non-limiting examples, object motion may include one or more of linear speed, angular speed, linear acceleration, angular acceleration, linear direction, angular direction, path of linear movement, and/or path of angular movement of one or more objects captured within the visual content. In some implementations, object motion may include a direction of gravity on the image capture device(s) during the capture of the visual content. The direction of gravity may indicate the positioning of the image capture device(s) with respect to gravity during capture of the visual content (e.g., upright, tilted, flipped).

In some implementations, motion detection component 102 may identify a motion of interest further based on classification of one or more things depicted within the visual content, and/or other information. A depiction of one or more things within the visual content may refer to inclusion of visual representation of one or more things within the visual content. A thing included within the visual content may refer to a living thing (e.g., person, animal, plant), an inanimate thing (e.g., vehicle, sporting equipment, tool), a moving thing (e.g., a moving person, a moving vehicle, wave), a stationary thing (e.g., person standing still, house, trees), a characteristic of the thing (e.g., biological characteristic of a person, characteristic of a person's clothing, characteristic of a vehicle), an emotion (e.g., a person smiling, laughing, yelling, screaming, crying), an activity (e.g., basketball, skiing, hiking, surfing, flying), an action (e.g., jumping, hitting, falling, standing up, spinning), a location (e.g., beach, underwater, desert, snowy scene, forest, mountain, sky), and/or other things included within the visual content. A particular motion within the visual content may be identified as a motion of interest may be identified based on both the motion and the classification of things depicted within the visual content. A classification of a thing within the visual content may include a determination of whether the thing is present or not present (e.g., true or false) within the visual content and/or a determination of the probability, score, metric value, and/or other value that the thing is present within the visual content.

For example, a motion of interest may include a particular motion of a particular thing within the visual content and/or a particular motion of a particular thing within a certain context. For example, a person performing a particular motion at a particular location or while exhibiting particular emotion may be identified as a motion of interest, while the person performing the particular motion at another location or while exhibit another emotion may not be identified as a motion of interest. A particular object (e.g., person, thing) moving in a particular way may be identified as a motion of interest while another object moving in the same way may not be identified as a motion of interest. Other identification motion of interest based on identity of object in motion and/or context of the motion are contemplated In some implementations, motion detection component 102 may identify a motion of interest based on a hierarchy of classification of things depicted within the visual content, and/or other information. For example, an activity may refer to the overall behavior, task, and/or event engaged in by a person, an action may refer to an act that may be performed during the activity, and a location may refer to the setting and/or the context in which the activity/action is taking place. For instance, an activity may include a person playing basketball or skating, an action may include the person jumping, and the location may include an indoor gym, a park, or the beach. A depiction of a person jumping during a basketball activity within an indoor gym may not be identified as a motion of interest, while a depiction of a person jumping during a skating activity at the beach may be identified as a motion of interest. Other identification of motion of interest based on hierarchy of classification of things are contemplated.

One or more classification of things depicted within the visual content may change the thresholds of things that are identified as being of interest. For example, a depiction of a person jumping during a basketball activity may be identified as a motion of interest based on the jump being of or greater than a certain height while a depiction of a person jumping during a skating activity may be identified as a motion of interest based on the jump being of or greater than a smaller height than the jump during the basketball activity.

The time duration component 104 may be configured to determine one or more time durations of interest based on the moment(s) of interest and/or other information. A time duration of interest may refer to a duration of time for which generation of images is desired. A time duration of interest may be the same or different from the moment of interest. A time duration of interest may be defined by one or more time points.

Figure 6:
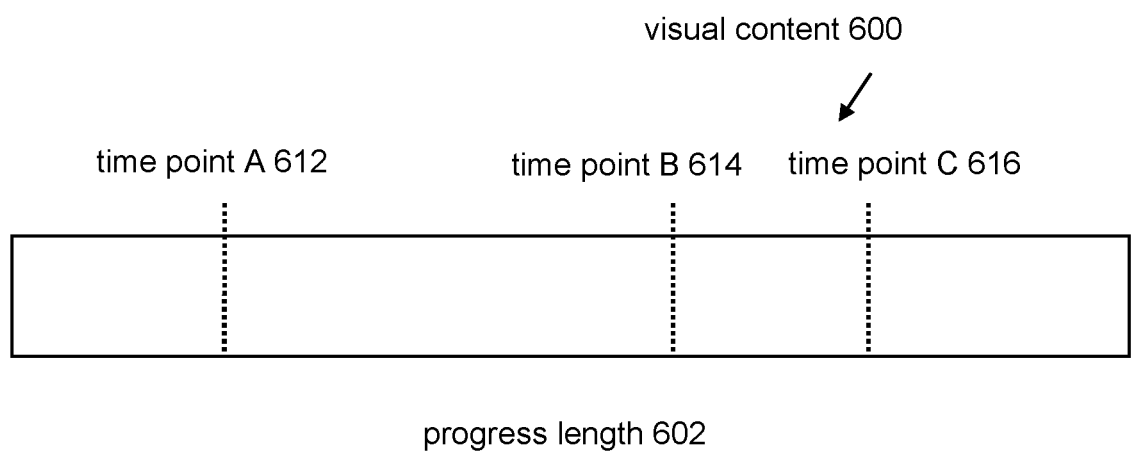
FIG. 6 illustrates example time points defining a time duration of interest.

FIG. 6 illustrates example time points defining a time duration of interest. FIG. 6 may include visual representation of a progress length 602 (defined in terms of time, number of images/video frames) of visual content 600 captured by an image capture device. One or more portions of the progress length 602 may be determined by the time duration component 104 as time duration(s) of interest based on one or more moments of interest and/or other information.

For example, a moment of interest may include a start time point (a time point A 612) and an end time point (a time point C 616). That is, the moment of interest may span a duration time within the progress length 602, with the duration of time starting at the time point A 612 and ending at the time point C 616. The time duration component 104 may determine the corresponding time duration of interest for the moment of interest to start at the start time point (the time point A 612) and end at the end time point (the time point C 612). In this example, the time duration of interest may span the same duration of time as the moment of interest.

As another example, a moment of interest may occur at a time point A 612, and the time duration component 104 may determine the corresponding time duration of interest for the moment of interest to start at the time point A 612 and end at some point after the time point A 612 (e.g., before, at, or after the time point C 612). As yet another example, a moment of interest may occur at a time point C 616, and the time duration component 104 may determine the corresponding time duration of interest for the moment of interest to start at some point before the time point C 616 (e.g., before, at, or after the time point A 612) and end at the time point C 616. As yet another example, a moment of interest may include (e.g., occur at, span over) a time point B 614, and the time duration component 104 may determine the corresponding time duration of interest for the moment of interest to include a duration of time preceding the time point B 614 and/or a duration of time subsequent to the time point B 614. In these examples, the time duration of interest and the moment of interest may span different points/durations of time.

In some implementations, a time duration of interest for a moment of interest may be determined further based on classification of the motion of interest and/or other information. The classification of the motion of interest may include classification of one or more activities during the moment of interest, classification of one or more actions during the moment of interest, classification of one or more locations within the visual content during the moment of interest, and/or classification of other things depicted within the visual content during the moment of interest. For example, whether the time duration of interest span the same duration of time or different durations of time, the starting point of the time duration of interest, the ending point of the time duration of interest, and/or other aspects of the time duration of interest may be determined based on what activit(ies), action(s), and/or location(s) are classified to be present or not present within the visual content and/or the probability, score, and/or metric value that the activit(ies), action(s), and/or location(s) are present within the visual content. Different time durations of interest may be determined for different classification of things depicted within the visual content. Different time durations of interest may be determined based on a hierarchy of classification of things depicted within the visual content, and/or other information.

For example, the time duration of interest for a motion of interest may be determined based on a hierarchy of classification of things depicted within the visual content. For instance, an activity may include a person biking or surfing, and an action may include the person falling. The time duration of interest for a person falling (motion of interest) while biking may be the same or different from the time duration of interest for the person falling while surfing. In some implementations, a motion of interest (e.g., falling) may be associated with a certain time duration of interest and the time duration of interest may be adjusted (increased, decreased, shifted) based on the activity (e.g., biking, surfing) and/or the location (e.g., mountain, forest, beach) in which the motion is occurring.

The generation component 106 may be configured to generate multiple images from the visual content based on the motion(s) of interest and/or other information. The multiple images may include portions of the visual content that span the time duration(s) of interest. The multiple images may include portions of the visual content captured at the beginning of a time duration of interest, at the end of the time duration of interest, and/or within the time duration of interest. The multiple images may include portions of the visual content including the motion(s) of interest. An image including one or more portions of the visual content including a motion of interest may include the image including the entire spatial view of the visual content (e.g., entire scene captured within an image) or one or more spatial portions of the visual content (e.g., one or more portions of a scene captured within an image). The generated images may be provided (e.g., presented on a display, transmitted to a computing device) for user selection, viewing, storage, upload, and/or other operations.

Generating an image may include creating, encoding, storing, marking, and/or otherwise generating the image. For example, generating an image from visual content may include encoding, creating, and/or storing one or more files including information that defines the image, with the image including one or more portions of the visual content. Generating an image from visual content may include creating, marking, and/or storing information that defines the visual content. For example, based on visual content including a motion of interest, some or all of the visual information defining the visual content may be marked (e.g., as including a motion of interest) and/or stored within the electronic storage 13. Based on visual content including a motion of interest, information defining some or all of the visual content may be created, marked, modified, and/or stored within the electronic storage 13. Other generation of images are contemplated.

In some implementations, storage of information defining visual content may include permanent storage of the information. For example, visual information defining visual content may be temporarily stored during identification of motion of interest. Based on the visual content including a motion of interest, multiple images of the visual content and/or information defining some or all of the visual content may be stored in non-volatile memory. Based on the visual content not including a motion of interest, the information defining the visual content may be discarded (e.g., deleted; removed from memory, such as the electronic storage 310; left in memory buffer to be overwritten).

In some implementations, a number of the images generated by the generation component 104 may be determined based on the time duration of interest, motion within the visual content, and/or other information. For example, a greater number of images may be generated based on a longer time duration of interest and/or the visual content including greater amount of motion than for a shorter time duration of interest and/or the visual content including less amount of motion. For instance, capture of activity with large motions (e.g., motion of an object, motion of an image capture device) may result in greater number of images being generated than capture of activity with smaller motions.

In some implementations, the generation component 104 may be configured to generate one or more videos based on the visual content and/or other information. That is, in addition to generation of images, the generation component 104 may generate one or more videos based on the visual content. A video generated by the generation component 104 may span one or more moments of interest and/or one or more time durations of interest. For example, video clips may be generated for individual motions of interest, with individual video clips spanning the corresponding duration of interest. For instance, for a motion of interest occurring at a moment of interest, the generation component 104 may generate a short video clip starting from, around, or ending at the moment of interest. The image(s) generated by the generation component 104 may be provided as highlight images of the video(s). That is, rather than requiring a user to manually identify and/or extract certain video frames of a video as a highlight image, the image(s) automatically generated by the generation component 104 may serve as the highlight image(s).

In some implementations, the image(s) generated by the generation component 104 may be provided as preview of the video(s). For example, a user may be presented with multiple images of a video, and the user's selection of an image may result in playback of the video starting from or near the video frame that corresponds to the selected image. The images may serve as links to different moments within the progress length of the video.

Figure 5:
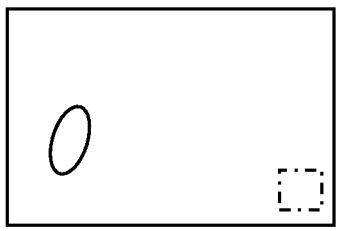
FIG. 5 illustrates example images and example composite images generated based on motion of interest.
Figure 5:
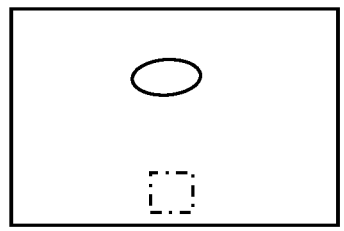
Figure 5:
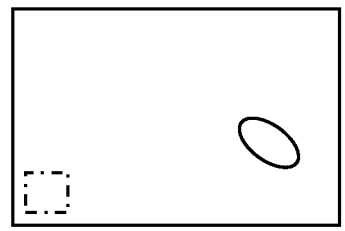
Figure 5:
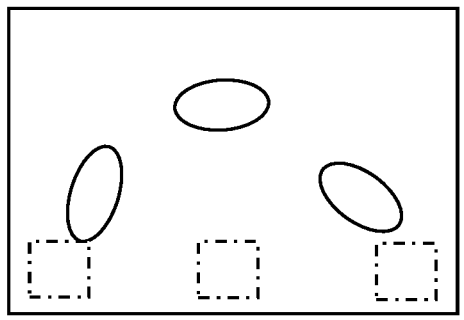
Figure 5:
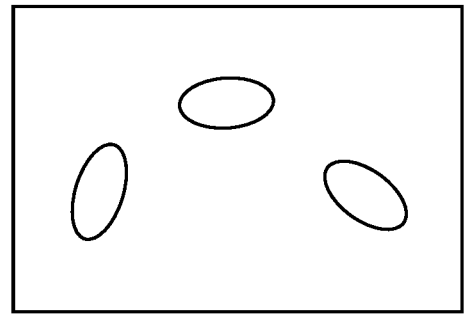

In some implementations, generation component 104 may be further configured to generate one or more composite images based on the multiple images and/or other information. A composite image may refer to an image generated from visual content captured at different times. For example, a composite image may include an image generated from visual content of multiple base images, where the base images were captured at different times and include representation of one or more objects at different times. A composite image may include merging of multiple representations of a single object or multiple objects across different times within a single image. FIG. 5 illustrates example images and example composite images generated based on a motion of interest. Based on a motion of interest (e.g., the motion 404) the images 512, 514, 516 may be generated. The images 512, 514, 516 may form base images from which a composite image 520 may be generated. In some implementations, the generation component 104 may generate one or more composite images (e.g., the composite image 520) without generating individual base images (e.g., the images 512, 514, 516).

In some implementations, one or more removal effects may be applied for generation of a composite image. A removal effect may remove one or more portions of visual content from being included within a composite image. A removal effect may remove one or more representations of objects from being included within a composite image. A removal effect may use a portion of visual content in which a representation of an object is not included to make the representation of an object not appear within a composite image. For example, referring to FIG. 5, the images 512, 514, 516 may include representations of an object moving to the right and another object moving to the left. The motion of the object moving to the right may be a motion of interest, and the motion of the object moving to the left may not be a motion of interest. Generation of a composite image without a removal effect may result in the composite image 520, which includes multiples representations of the object moving to the right and multiples representations of the object moving to the left. A removal effect may be applied to remove the representations of the object moving to the left and generate a composite image 530. For instance, the composite image 530 may be generated by using the lower right corner of the visual content from the image 514 and/or the image 516, rather than using the lower right corner of the visual content from the image 512, so that the composite image 530 does not include a representation of the object moving to the left at the lower right corner.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
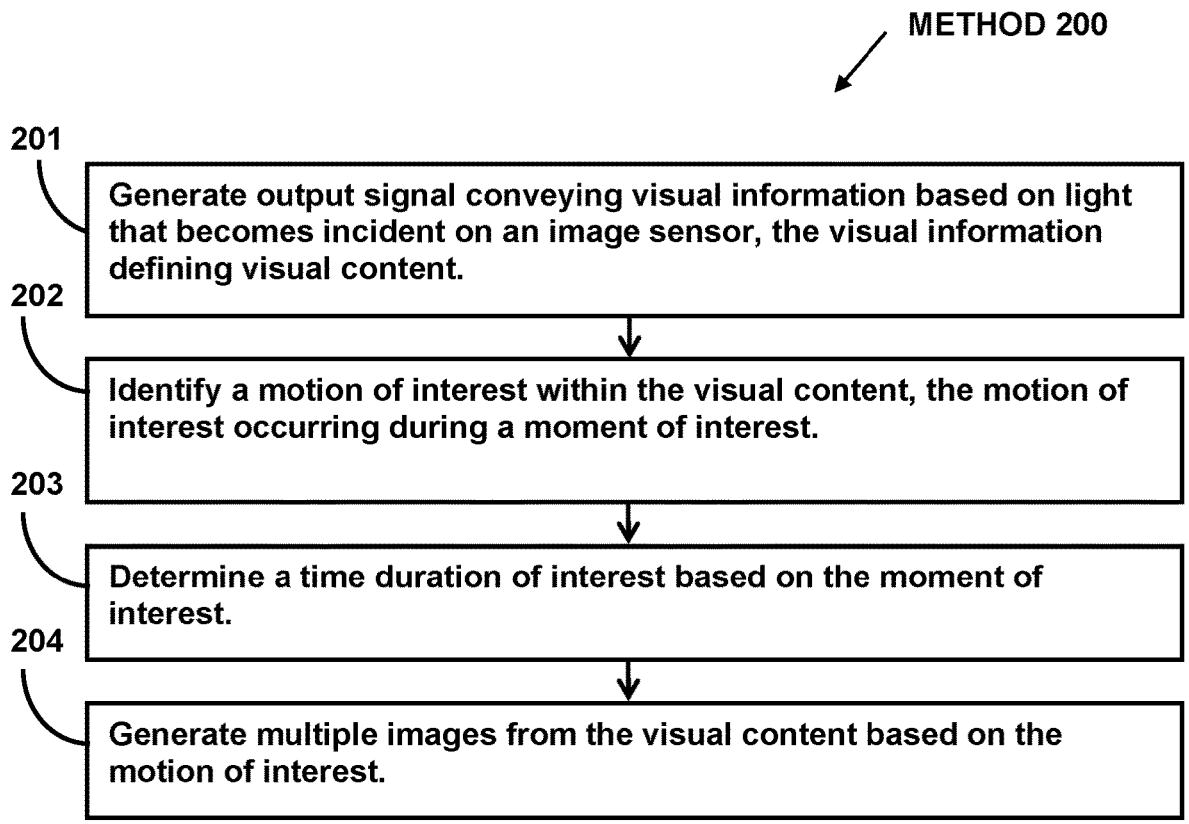
FIG. 2 illustrates a method for automatically capturing images.

FIG. 2 illustrates method 200 for operating an image capture device. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operation of method 200.

Referring to FIG. 2 and method 200, at operation 201, output signal conveying visual information may be generated based on light that becomes incident on an image sensor. The visual information may define visual content. In some implementation, operation 201 may be performed by a component the same as or similar to the image sensor 306 (Shown in FIG. 3 and described herein).

At operation 202, a motion of interest within the visual content may be identified. The motion of interest may occur during a moment of interest. In some implementations, operation 202 may be performed by a processor component the same as or similar to the moment detection component 102 (Shown in FIG. 1 and described herein).

At operation 203, a time duration of interest may be determined based on the moment of interest. In some implementations, operation 203 may be performed by a processor component the same as or similar to the time duration component 104 (Shown in FIG. 1 and described herein).

At operation 204, multiple images may be generated from the visual content based on the motion of interest. The multiple images may include portions of the visual content that span the time duration of interest. In some implementations, operation 203 may be performed by a processor component the same as or similar to the generation component 106 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. An image capture device comprising:
   a housing;
   an image sensor carried by the housing and configured to generate an output signal conveying visual information based on light that becomes incident thereon, the visual information defining visual content;
   an optical element carried by the housing and configured to guide light within a field of view to the image sensor; and
   one or more physical processors carried by the housing, the one or more physical processors configured by machine-readable instructions to:
      temporarily store the visual content for potential generation of images from the temporarily-stored visual content;
      identify a motion of interest within the temporarily-stored visual content, the motion of interest occurring during a moment of interest, wherein the motion of interest is identified based on a hierarchy of classification of things depicted within the temporarily-stored visual content, wherein the hierarchy of classification of things depicted within the temporarily-stored visual content includes classification of an activity and classification of an action within the activity;
      determine a time duration of interest from which the images are to be generated from the temporarily-stored visual content based on the moment of interest; and
      generate multiple images from the temporarily-stored visual content based on the identification of the motion of interest within the temporarily-stored visual content, the multiple images including portions of the temporarily-stored visual content that span the time duration of interest.

2. The image capture device of claim 1, wherein the multiple images are generated at a first resolution, the first resolution being higher than a second resolution with which the image capture device is capable of generating videos.

3. The image capture device of claim 1, wherein the multiple images are generated from the temporarily-stored visual content further based on an operation of the image capture device in a motion burst capture mode, the operation of the image capture device in the motion burst capture mode including setting of a resolution to generate the multiple images and not including generation of a video.

4. The image capture device of claim 1, wherein the motion of interest includes a motion of the image capture device or a motion of an object within the temporarily-stored visual content.

5. The image capture device of claim 1, wherein a number of the multiple images that are generated from the temporarily-stored visual content is determined based on the time duration of interest such that a greater number of images are generated from the temporarily-stored visual content for a longer time duration of interest.

6. The image capture device of claim 1, wherein a number of the multiple images that are generated from the temporarily-stored visual content is determined based on the motion of interest such that a greater number of images are generated from the temporarily-stored visual content for a greater amount of motion included in the motion of interest.

7. The image capture device of claim 1, wherein the one or more physical processors are further configured by the machine-readable instructions to:
generate a composite image based on the multiple images.

8. The image capture device of claim 1, wherein the identification of the motion of interest based on the hierarchy of classification of things depicted within the temporarily-stored visual content includes:
a first action being performed during a first activity being identified as the motion of interest; and
the first action being performed during a second activity different from the first activity not being identified as the motion of interest.

9. The image capture device of claim 1, wherein the motion of interest is identified based on a threshold, and the identification of the motion of interest based on the hierarchy of classification of things depicted within the temporarily-stored visual content during the motion of interest includes:
a first action being performed during a first activity being identified as the motion of interest based on the first action satisfying a first value of the threshold; and
the first action being performed during a second activity is identified as the motion of interest based on the first action satisfying a second value of the threshold different from the first value of the threshold.

10. The image capture device of claim 1, the motion of interest is identified based further based on information regarding compression of the temporarily-stored visual content, the information regarding compression of the temporarily-stored visual content including information regarding changes between adjacent video frames.

11. A method for generating images, the method performed by an image capture device including an image sensor configured to generate an output signal conveying visual information based on light that becomes incident thereon, the visual information defining visual content, the method comprising:
temporarily storing the visual content for potential generation of images from the temporarily-stored visual content;
identifying a motion of interest within the temporarily-stored visual content, the motion of interest occurring during a moment of interest, wherein the motion of interest is identified based on a hierarchy of classification of things depicted within the temporarily-stored visual content, wherein the hierarchy of classification of things depicted within the temporarily-stored visual content includes classification of an activity and classification of an action within the activity;
determining a time duration of interest from which the images are to be generated from the temporarily-stored visual content based on the moment of interest; and
generating multiple images from the temporarily-stored visual content based on the identification of the motion of interest within the temporarily-stored visual content, the multiple images including portions of the temporarily-stored visual content that span the time duration of interest.

12. The method of claim 11, wherein the multiple images are generated at a first resolution, the first resolution being higher than a second resolution with which the image capture device is capable of generating videos.

13. The method of claim 11, wherein the multiple images are generated from the temporarily-stored visual content further based on an operation of the image capture device in a motion burst capture mode, the operation of the image capture device in the motion burst capture mode including setting of a resolution to generate the multiple images and not including generation of a video.

14. The method of claim 11, wherein the motion of interest includes a motion of the image capture device or a motion of an object within the temporarily-stored visual content.

15. The method of claim 11, wherein a number of the multiple images that are generated from the temporarily-stored visual content is determined based on the time duration of interest such that a greater number of images are generated from the temporarily-stored visual content for a longer time duration of interest.

16. The method of claim 11, wherein a number of the multiple images that are generated from the temporarily-stored visual content is determined based on the motion of interest such that a greater number of images are generated from the temporarily-stored visual content for a greater amount of motion included in the motion of interest.

17. The method of claim 11, further comprising:
generating a composite image based on the multiple images.

18. The method of claim 11, wherein the identification of the motion of interest based on the hierarchy of classification of things depicted within the temporarily-stored visual content includes:
a first action being performed during a first activity being identified as the motion of interest; and
the first action being performed during a second activity different from the first activity not being identified as the motion of interest.

19. The method of claim 11, wherein the motion of interest is identified based on a threshold, and the identification of the motion of interest based on the hierarchy of classification of things depicted within the temporarily-stored visual content during the motion of interest includes:
a first action being performed during a first activity being identified as the motion of interest based on the first action satisfying a first value of the threshold; and
the first action being performed during a second activity is identified as the motion of interest based on the first action satisfying a second value of the threshold different from the first value of the threshold.

20. The method of claim 11, the motion of interest is identified based further based on information regarding compression of the temporarily-stored visual content, the information regarding compression of the temporarily-stored visual content including information regarding changes between adjacent video frames.

* * * * *